United States Patent [19]

Ullman et al.

[11] Patent Number: 5,068,284

[45] Date of Patent: Nov. 26, 1991

[54] BLOCKED AMINE TERMINATED POLYCARBONATES AND PRODUCTS OBTAINED THEREFROM

[75] Inventors: Timothy J. Ullman, Voorheesville; Ronald J. Gambale, Croton-On-Hudson, both of N.Y.

[73] Assignee: General Electric Company, Schenectady, N.Y.

[21] Appl. No.: 562,354

[22] Filed: Aug. 3, 1990

[51] Int. Cl.$^5$ ...................... C08G 64/14; C08G 64/18; C08L 69/00
[52] U.S. Cl. ...................................... 525/67; 525/394; 525/425; 525/433; 525/467; 528/170; 528/203
[58] Field of Search .................. 528/170, 203; 525/67, 525/394, 425, 433, 467

[56] References Cited

U.S. PATENT DOCUMENTS

| | | | |
|---|---|---|---|
| 3,085,992 | 4/1963 | Lee | 528/199 |
| 3,399,172 | 8/1968 | Jaquiss | 528/195 |
| 4,111,910 | 9/1978 | Baggett | 528/196 |
| 4,556,704 | 12/1985 | Rosenquist | 528/203 |
| 4,732,934 | 3/1988 | Hathaway | 525/67 |
| 4,792,477 | 12/1988 | Ochiumi | 525/67 |
| 4,940,771 | 7/1990 | Maresca | 525/394 |
| 4,959,411 | 9/1990 | Gambale | 525/67 |

Primary Examiner—John C. Bleutge
Assistant Examiner—David Buttner
Attorney, Agent, or Firm—William A. Teoli; James C. Davis, Jr.; William H. Pittman

[57] ABSTRACT

Blocked amine terminated polycarbonate is provided which can be used to form anhydride terminated polycarbonates, or copolymers with various functionalized organic polymers. A blocked amino phenol, such as N-t-butoxycarbonyl tyramine can be used as a chain stopper under interfacial conditions to chain stop polycarbonate. The t-butoxycarbonyl can be removed by melt processing the polycarbonate to yield an amine end group which can be reacted with other polymers or with an organic dianhydride to form anhydride terminated polycarbonate. The anhydride terminated polycarbonates can be used to form copolymers with amine terminated polyamides.

13 Claims, No Drawings

BLOCKED AMINE TERMINATED POLYCARBONATES AND PRODUCTS OBTAINED THEREFROM

BACKGROUND OF THE INVENTION

The present invention relates to blocked amine terminated polycarbonates and to certain anhydride terminated polycarbonates obtained therefrom. More particularly, the present invention relates to the employment of blocked amine and anhydride terminated polycarbonates to provide a variety of organic copolymers, by effecting reaction under neat conditions between such polycarbonates and various functionalized organic polymers.

Prior to the present invention, functionalized polycarbonates, such as anhydride terminated polycarbonates, were made by effecting reaction between a hydroxy terminated polycarbonate and a tricarboxylic acid derivative, such as, trimellitic anhydride acid chloride, shown by U.S. Pat. No. 4,732,934. The employment of interfacial reaction conditions using an organic solvent for making anhydride chain-stopped polycarbonates are also shown in U.S. Pat. No. 4,853,458.

It would be desirable therefore to develop alternative procedures for making functionalized polycarbonates without resorting to such costly and environmentally unattractive organic solvent based methods.

SUMMARY OF THE INVENTION

The present invention is based on the discovery that polycarbonates having terminal groups of the formula,

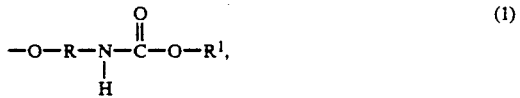

where R is a $C_{(2-13)}$ divalent organo radical, and $R^1$ is a $C_{(3-8)}$ branched alkyl radical such as isopropyl and tert-butyl, can be reacted directly with an organic dianhydride, such as pyromellitic dianhydride and converted to anhydride terminated polycarbonates thermally under neat conditions. The resulting anhydride terminated polycarbonates can be reacted with amine functionalized polyamide to form polycarbonate-polyamide block copolymers. In addition, polycarbonate having functional groups of formula (1) can be reacted with various functionalized organic polymers, such as anhydride functionalized polyphenylenether, maleic anhydride functionalized polypropylene, maleic anhydride functionalized polyethylene, epoxy functionalized EPDM polymer, and oxazoline polymers (RPS).

STATEMENT OF THE INVENTION

There is provided by the present invention, a polycarbonate reaction product comprising the polymeric or copolymeric extrudate obtained from contact under melt extrusion conditions between (A) polycarbonate having terminal groups of the formula (1), and organic polymer functionalized with epoxy, anhydride or oxazoline groups, or (B) polycarbonate having terminal groups of the formula,

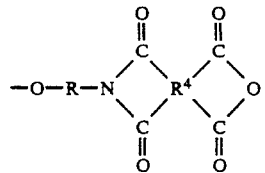

and an amine functionalized organic or organic-silicon polymer, where R is as previously defined and $R^4$ is a tetravalent $C_{(6-30)}$ aromatic organic radical, for example

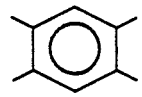

Polycarbonates having terminal blocked amine groups of formula (1) can be made by phosgenating a mixture of dihydric phenol having the formula,

and a chain-stopping amount of a blocked amine hydroxy organic compound of the formula,

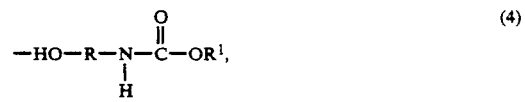

where R and $R^1$ are as previously defined, and $R^5$ is a $C_{(6-30)}$ divalent aromatic organic radical, to produce polycarbonate having blocked amine terminal groups of formula 1.

Suitable dihydric phenols which can be utilized in the practice of the present invention which are included within formula (3) are for example,
resorcinol
4-bromoresorcinol
hydroquinone
4,4'-dihydroxybiphenyl
1,6-dihydroxynaphthalene
2,6-dihydroxynaphthalene
bis(4-hydroxyphenyl)methane
bis(4-hydroxyphenyl)diphenylmethane
bis(4-hydroxyphenyl)-1-naphthylamethane
1,1-bis(4-hydroxyphenyl)ethane
1,2-bis(4-hydroxyphenyl)ethane
1,1-bis(4-hydroxyphenyl)-1-phenylethane
2,2-bis(4-hydroxyphenyl)propane("bisphenol A")
2-(4-hydroxyphenyl)-2-)3-hydroxyphenyl)propane
2,2-bis(hydroxyphenyl)butane
1,2-bis(4-hydroxyphenyl)isobutane
1,1-bis(4-hydroxyphenyl)cyclohexane
1,1-bis(4-hydroxyphenyl)cyclododecane
trans-2,3-bis(4-hydroxyphenyl)-2-butene
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(isopropyl-4-hydroxyphenyl)propane
2,2-bis(3-sec-butyl-4-hydroxyphenyl)propane 2,2-bis(3-t-butyl-4-hydroxyphenyl)propane
2,2-bis(3-cyclohexyl-4-hydroxyphenyl)propane
2,2-bis(3-allyl-4-hydroxyphenyl)propane
2,2bis(3-methoxy-4-hydroxyphenyl)propane
2,2-bis(3,5-dimethyl-4-hydroxyphenyl)propane
2,2-bis(2,3,5,6-tetramethyl-4-hydroxyphenyl)propane 2,2-bis(3,5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl)-propane
$\alpha,\alpha$-bis(4-hydroxyphenyl)toluene
$\alpha,\alpha,\alpha',\alpha'$-tetramethyl-$\alpha,\alpha'$-bis(4-hydroxyphenyl)-p-xylene
2,2-bis(4-hydroxyphenyl)hexafluoropropane
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl)ethylene
4,4'-dihydroxybenzophenone
3,3-bis(4-hydroxyphenyl)-2-butanone
1,6-bis(4-hydroxyphenyl)-1,6-hexanedione
bis(4-hydroxyphenyl)ether
bis(4-hydroxyphenyl)sulfide
bis(4-hydroxyphenyl)sulfoxide
bis(4-hydroxyphenyl)sulfone
bis(,35-dimethyl-4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane("-spirobiindane bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole
4,4'-dihydroxy-diphenyl-1,1-butane
4,4'-dihydroxy-diphenyl-1,1-isobutane
4,4'-dihydroxy-diphenyl-1,1-cyclopentane
4,4'-dihydroxy-diphenyl-1,1-cyclohexane
4,4'-dihydroxy-diphenyl-phenyl methane
4,4'-dihydroxy-diphenyl-2-chlorophenyl methane
4,4'-dihydroxy-diphenyl-2,4-dichlorophenyl methane
4,4'-dihydroxy-diphenyl-p-isopropylphenyl methane
4,4'-dihydroxy-diphenylnaphthyl methane
4,4'-dihydroxy-diphenyl-2,2-propane
4,4'-dihydroxy-3-3methyl-diphenyl-2,2-propane
4,4'-dihydroxy-3-cyclohexyl-diphenyl-2,2-propane
4,4'-dihydroxy-3-methoxy-diphenyl-2,2-propane
4,4'-dihydroxy-3-isopropyl-diphenyl-2,2-propane
4,4'-dihydroxy-3,3'-dimethyl-diphenyl-2,2-propane
4,4'-dihydroxy-3,3'-dichloro-diphenyl-2,2-propane
4,4'-dihydroxy-diphenyl ether Some of the blocked amine hydroxy organic compounds included within formula (4), are for example, N-t-butoxycarbonyl tyramine, which can be made by the reaction of di-t-butyl carbonate with tyramine. In addition to di-t-butyl carbonate, there also can be used BOC-ON of the Aldrich Chemical Company, namely 2[(t-butoxy carbonyloxy imino)-2-phenyl acetonitrile]. Although tyramine is preferred, other amino phenols, such as 4-(amino methyl) phenol and 4-amino phenol can be used, It is preferred however to use aliphatic amine substituted phenols, where the aliphatic block length is $C_{(1-18)}$. In addition to di-t-butyl carbonate, other carbonates can be used, particularly carbonates which provide branched alkoxy carbonyls, such as isopropyl, isobutyl, neopentyl and 2,2,3,3-tetramethylbutyl amine protecting groups.

Included among the organic dianhydrides which can be used in the practice of the present invention to produce the anhydride terminated polycarbonates under melt conditions are for example, bisphenol A dianhydride, 1,2,4,5-benzenetetracarboxylic dianhydride, 3,3',4,4'-benzophenone tetracarboxylic dianhydride, 1,4,5,8-naphthalene tetracarboxylic dianhydride and 3,4,9,10-perylene tetracarbonylic dianhydride.

Polycarbonates functionalized with terminal groups of formulas (1) and (2) can have intrinsic viscositus of 0.3 dl/g to 0.7 dl/g as determined in methylene chloride.

There are included by the functionalized organic polymers which can be coextruded with the polycarbonate having terminal groups of formula (1), epoxy resins such as glycidyl ethers of bisphenol A, polyphenylene ether having terminal trimellitic anhydride ester linkages, polypropylene having maleic anhydride groups, polyethylene having maleic anhydride groups, EPDM rubber having epoxy functionality, and oxazoline substituted polystyrene (RPS).

Among the polyamides which can be coextruded with the polycarbonates having terminal groups of formula (2) there are included Nycoa 471, a polycaprolactam obtained from the Nylon Corp. of America, Selar, Pa., an amorphous polyamide obtained from E.I. DuPont de Nemours Co., and Carpron 1580, a polycaprolactam of the Allied Co. In addition, there can be coextruded, amine terminated polydiorganosiloxane, such as polydimethylsiloxanes.

The copolymers made from polycarbonate having terminal groups of formula (1) and (2) enjoy the high performance of conventional polycarbonates with improved solvent resistance.

In order that those skilled in the art will be better able to practice the present invention the following examples are given by way of illustration and not by way of limitation. All parts are by weight.

EXAMPLE 1

A mixture of 68.59 grams (0.5 mol) of tyramine ($\beta$-hydroxyphenylethylamine), 109.13 grams (0.5 mol) of di-t-butylcarbonate, 27.83 grams (0.275 mol) of triethylamine and 2700 ml of 80:20 t-butanol:deionized water solution was stirred for 16 hours at room temperature. The volume of the reaction mixture was reduced to 500-600 ml using a rotary evaporator. The viscous solution was extracted three times with 500 ml portions of chloroform. The chloroform extractions were combined, dried with anhydrous sodium sulfate, filtered and the chloroform was removed under reduced pressure. The product crystallized slowly to form a waxy solid and was recrystallized from acetonitrile. Based on method of preparation, there was obtained 116.13 grams (98% yield) of N-t-butoxycarbonyl tyramine (N-BOC-tyramine). The identity of the chainstopper was further confirmed by $^1$H NMR analysis.

A mixture of 25 grams (0.110 mol) of bisphenol A, 75 ml of methylene chloride, 65 ml of water, 0.914 grams (0.00385 mols) of the N-BOC-tyramine chainstopper, and 3.0 ml of a 5% solution of triethylamine in methylene chloride was stirred continously. There was added to the aforementioned mixture, a 50% sodium hydroxide solution until a pH of 11 was obtained. The mixture was then phosgenated utilizing a rate of 0.8 grams of phosgene per minute. The pH was maintained at 11 during the phosgenation which required 18-22 minutes. There was then added, an additional 100 ml of methylene chloride and the organic phase was removed, washed once with 7% hydrochloric acid and 3 times with water. The solution was poured into methanol to effect precipitation of product. The product was filtered and dried in a vacuum oven to yield 23-28 grams of N-BOC-tyramine chain stopped polycarbonate (N-BOC-tyr-PC).

EXAMPLE 2

A dried mixture of N-BOC-tyramine-PC and pyromellitic dianhydride (PMDA) in a 96.6:3.4 ratio was tumble mixed in a jar mill for 30 minutes and extruded at 250°-320° C. on a vented, 20 mm, Welding Engineers counter-rotating twin screw extruder. The extruded material was quenched in water, pelletized, and dried in a vacuum oven at 100° C. The BOC group was found to have thermally cleaved from the polycarbonate, by the release of $CO_2$ and isobutylene, yet the tyramine chain-stopper remained attached. The unprotected amine rapidly formed an imide with PMDA under the above processing conditions. Severe molecular weight loss or polymer chain extension were not observed in the extruded PMDA-capped tyramine-chain stopped polycarbonate (PMDA-tyr-PC).

Loss of the $CO_2$ and $R^1$ groups from the N-BOC-tyr-PC was confirmed by $^1H$ NMR. In addition, the $^1H$ NMR showed a down-field shift of the R protons indicative of the imidization of the unprotected amine. Further evidence for imidization, as in formula (2), was the imide bond absorbance at 1858 cm$^{-1}$ in the infrared spectrum, as obtained by Fourier-Transform infrared spectroscopy (FT-IR).

EXAMPLE 3-8

Following the extrusion procedure of Example 2, PMDA-tyr-PC was melt blended with a variety of amine-containing polyamides. The remaining anhydride functionality on the PMDA-tyr-PC reacted with the amine functionality of the polyamides through an imidization reaction to form significant amounts of polycarbonate-polyamide copolymer. The compositions and results are summarized below in Table 1.

Percent copolymer was determined by chloroform soxhlet extraction of the extruded blends, after grinding to a fine powder. The percentage values represent the amount of total polycarbonate bound to polyamide and hence chloroform insoluble.

Component A was PMDA-tyr-PC, Component B was Nylon 6 (Nycoa 471—available from Nylon Corp. of America), Component C was Nylon 6,6 (NP 10,000—available from Nylit Inc.), Component D was an amorphous Nylon (Selar, Pa.—available from E.I DuPont de Nemours Co.), Component F was a non-functionalized BPA-polycarbonate (Lexan 131—available from General Electric Co.).

TABLE I

| Example | Component A % | Component B % | Component C % | Component D % | Component F % | Copolymer % |
|---------|---------------|---------------|---------------|---------------|---------------|-------------|
| 3 | 50 | 50 | — | — | — | 57 |
| 4 | 50 | — | 50 | — | — | 11 |
| 5 | 50 | — | — | 50 | — | 54 |
| 6 | — | 50 | — | — | 50 | 0 |
| 7 | — | — | 50 | — | 50 | 0 |
| 8 | — | — | — | 50 | 50 | 0 |

EXAMPLES 9-14

Components A, B, C, D and F from examples 3-8 were each blended with impact modifier E, an MBS core-shell Paraloid KM-653, available from Rohm and Haas. The respective blends were tumble mixed in a jar mill for 30 minutes and extruded as in the procedure of example 2. Izod test bars were then injection molded at 210°-320° C. Impact strengths were determined at room temperature. The results are shown in Table II.

TABLE II

| Example | Component A % | Component B % | Component C % | Component D % | Component E % | Component F % | Impact Strength ⅛ inch Notched Izod Ft.-lbs./in. | Joules/m |
|---------|----|----|----|----|----|----|------|------|
| 9  | 40   | 40   | —    | —  | 20   | —    | 9.9  | 524.7 |
| 10 | 43.8 | —    | 43.8 | —  | 12.4 | —    | 12.4 | 657.2 |
| 11 | 45   | —    | —    | 45 | 10   | —    | 11.1 | 588.3 |
| 12 | —    | 40   | —    | —  | 20   | 40   | 0.8  | 42.4 |
| 13 | —    | —    | 43.8 | —  | 12.4 | 43.8 | 1.0  | 53.0 |
| 14 | —    | —    | —    | 45 | 10   | 45   | 2.2  | 116.6 |

EXAMPLE 15

Equal part blends of N-BOCtyr-polycarbonate (A) with (G), an anhydride functionalized polypropylene resin (Hercaprine A manufactured by the Himont Co. of Wilmington, Del., and (H), a polyphenylene ether functionalized with trimellitic anhydride acid chloride (PPE-TAAC) were respectively tumble mixed. The blends were then extruded at 250° C. to 320° C.

Extruded blend A-G was chloroform soxhlet extracted after it had been ground to a fine powder. Extruded blend A-H was treated with methylene chloride to effect complexation of the PPE-TAAC. The percent copolymer (insolubles) recovered from the respective extracted extruded blends are shown as follows:

TABLE III

| Extruded Blend | Copolymer (%) |
|----------------|---------------|
| A-G | 22 |
| A-H | 35 |

Although the above examples are directed to only a few of the very many variables to which the present invention is directed, it should be understood that the present invention is directed to a much broader variety of blocked amine terminated and anhydride terminated polycarbonates and to copolymers derived therefrom.

What is claimed is:

1. A polycarbonate having terminal groups of the formula,

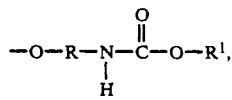

where R is a $C_{(2-13)}$ divalent organo radical, and $R^1$ is $C_{(3-8)}$ branched alkyl radical.

2. A polycarbonate in accordance with claim 1, having terminal groups where R is phenylene and $R^1$ is tert-butyl.

3. A bisphenol A polycarbonate in accordance with claim 1.

4. A polycarbonate having terminal groups of the formula,

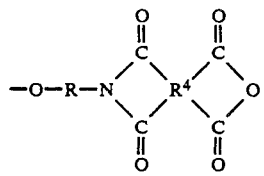

where R is a $C_{(2-13)}$ divalent organo radical and $R^4$ is a tetravalent $C_{(2-30)}$ aromatic organic radical.

5. A polycarbonate in accordance with claim 4, where R is a $C_{(2-13)}$ divalent organo radical and $R^4$ is

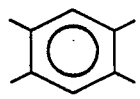

6. A polycarbonate reaction product comprising the polymeric or copolymeric extrudate obtained from contact under melt extrusion conditions between (A) polycarbonate having terminal groups of the formula,

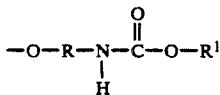

and organic polymer functionalized with epoxy, anhydride or oxazoline groups, or (B) polycarbonate having terminal groups of the formula,

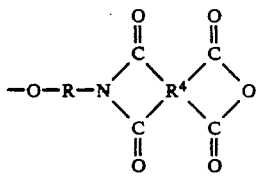

and an amine functionalized organic or organic-silicon, polymer, where R is where R is a $C_{(2-13)}$ divalent organo radical, $R^1$ is a $C_{(3-8)}$ branched aklyl radical and $R^4$ is a tetra valent $C_{(6-30)}$ aromatic organic radical.

7. A polycarbonate reaction product in accordance with claim 6, where the functionalized organic polymer of (A) is a trimellitic anhydride functionalized polyphenylene ether.

8. A polycarbonate reaction product in accordance with claim 6, where the functionalized, organic polymer is a maleic anhydride functionalized polypropylene.

9. A polycarbonate reaction product in accordance with claim 6, where the functionalized organic polymer is a maleic anhydride functionalized polyethylene.

10. A polycarbonate reaction product in accordance with claim 6, where the functionalized organic polymer of (A) is maleic anhydride functionalized EPDM rubber.

11. A polycarbonate reaction product in accordance with claim 6, where the functionalized organic polymer of (A) is an oxazoline functionalized polystyrene.

12. A polycarbonate reaction product in accordance with claim 6, where the polycarbonate of (B) has terminal pyromellitic dianhydride units.

13. A polycarbonate reaction product in accordance with claim 6, where the polycarbonate of (B) is contacted with a polyamide.

* * * * *